(12) United States Patent
Fujibayashi

(10) Patent No.: US 12,001,665 B2
(45) Date of Patent: *Jun. 4, 2024

(54) SLIDE BAR DISPLAY CONTROL DEVICE AND SLIDE BAR DISPLAY CONTROL METHOD

(71) Applicant: NEC Corporation, Tokyo (JP)

(72) Inventor: Toshihiko Fujibayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,692

(22) Filed: Oct. 7, 2022

(65) Prior Publication Data

US 2023/0034697 A1   Feb. 2, 2023

Related U.S. Application Data

(63) Continuation of application No. 17/135,110, filed on Dec. 28, 2020, now Pat. No. 11,520,475, which is a (Continued)

(30) Foreign Application Priority Data

Dec. 18, 2008   (JP) .................................. 2008-321819

(51) Int. Cl.
  *G06F 3/048*   (2013.01)
  *G06F 3/04847*   (2022.01)
  *G06F 3/0488*   (2022.01)

(52) U.S. Cl.
  CPC .......... *G06F 3/04847* (2013.01); *G06F 3/048* (2013.01); *G06F 3/0488* (2013.01)

(58) Field of Classification Search
  None
  See application file for complete search history.

(56) References Cited

U.S. PATENT DOCUMENTS

| 5,874,961 A | 2/1999 | Bates et al. |
| 5,977,972 A | 11/1999 | Bates et al. |

(Continued)

FOREIGN PATENT DOCUMENTS

| EP | 1273851 A2 | 1/2003 |
| JP | H9-198224 A | 7/1997 |

(Continued)

OTHER PUBLICATIONS

Korean Office Action for KR Application No. 10-2011-7013964 dated Jan. 9, 2014 with Partial English Translation.

(Continued)

*Primary Examiner* — Xuyang Xia
(74) *Attorney, Agent, or Firm* — Sughrue Mion, PLLC

(57) ABSTRACT

The slide bar display control device according to the present invention includes, a display means which indicates a first slide bar including a first slider and a first bar, an input means which can select an arbitrary part of the first slide bar shown on the display means based on touch operation, and a control means which controls the display means and the input means, wherein, when the control means detects that a first operation has been performed in a state that the first slider shown on the display means is being touched in the input means, the display means indicates a second slide bar including a second slider and a second bar, and wherein the second slider is a slider different in a variation amount of a set value per unit moving distance from the first slider.

19 Claims, 16 Drawing Sheets

Related U.S. Application Data continuation of application No. 16/790,861, filed on Feb. 14, 2020, now Pat. No. 10,891,043, which is a continuation of application No. 16/257,515, filed on Jan. 25, 2019, now Pat. No. 10,921,970, which is a continuation of application No. 13/963,765, filed on Aug. 9, 2013, now Pat. No. 10,198,166, which is a continuation of application No. 13/133,716, filed as application No. PCT/JP2009/071080 on Dec. 14, 2009, now Pat. No. 8,954,889.

(56) References Cited

U.S. PATENT DOCUMENTS

| | | | |
|---|---|---|---|
| 6,061,062 A | | 5/2000 | Venolia |
| 6,204,846 B1* | | 3/2001 | Little .................. G06F 3/04855 |
| | | | 715/974 |
| 922,816 A1 | | 7/2005 | Amin et al. |
| 7,134,093 B2 | | 11/2006 | Etgen et al. |
| 7,345,783 B2* | | 3/2008 | Suzuki ............... H04N 1/00278 |
| | | | 345/475 |
| 7,380,216 B2 | | 5/2008 | Feig et al. |
| 8,650,502 B2 | | 2/2014 | Lentz et al. |
| 8,737,821 B2 | | 5/2014 | Li |
| 9,170,721 B2* | | 10/2015 | Kim ................... G06F 3/04855 |
| 2002/0054144 A1 | | 5/2002 | Morris-Yates |
| 2002/0063737 A1* | | 5/2002 | Feig .................... G06F 3/04847 |
| | | | 715/786 |
| 2002/0186252 A1 | | 12/2002 | Himmel et al. |
| 2003/0098871 A1 | | 5/2003 | Kawano et al. |
| 2004/0085384 A1 | | 5/2004 | Keely et al. |
| 2005/0138565 A1 | | 6/2005 | Jaeger |
| 2008/0034316 A1* | | 2/2008 | Thoresson ........... G06F 3/04855 |
| | | | 715/781 |
| 2008/0094077 A1 | | 4/2008 | Philipp |
| 2008/0094367 A1 | | 4/2008 | Van De Ven et al. |
| 2008/0158261 A1* | | 7/2008 | Gould .................. G11B 27/105 |
| | | | 345/157 |
| 2008/0165145 A1 | | 7/2008 | Herz ................... G06F 3/04883 |
| | | | 345/173 |
| 2008/0178118 A1 | | 7/2008 | Kim |
| 2010/0056221 A1* | | 3/2010 | Park ................... G06F 3/04883 |
| | | | 345/173 |
| 2010/0058228 A1 | | 3/2010 | Park |
| 2010/0083166 A1 | | 4/2010 | Happonen |
| 2010/0095239 A1 | | 4/2010 | Mccommons et al. |

FOREIGN PATENT DOCUMENTS

| | | |
|---|---|---|
| JP | H11-345056 A | 12/1999 |
| JP | 2000-082048 A | 3/2000 |
| JP | 2001-202176 A | 7/2001 |
| JP | 2002-230951 A | 8/2002 |
| JP | 2009-295147 A | 12/2009 |

OTHER PUBLICATIONS

Japanese Office Action for JP Application No. 2013-127886 dated Dec. 3, 2013 with English Translation.
The Extended European Search Report for EP Application No. 09833489.9 dated Apr. 2, 2014.
International Search Report for PCT/JP2009/071080 dated Mar. 23, 2010.
Extended European Search Report for EP Application No. EP18211591.5 dated Mar. 22, 2019.

* cited by examiner

SLIDE BAR DISPLAY CONTROL DEVICE AND SLIDE BAR DISPLAY CONTROL METHOD

REFERENCE TO RELATED APPLICATION

This present application is a Continuation application of Ser. No. 17/135,110 filed on Dec. 28, 2020, which is a Continuation application of Ser. No. 16/790,861 filed on Feb. 14, 2020, which issued as U.S. Pat. No. 10,891,043, which is a Continuation application of Ser. No. 16/257,515 filed on Jan. 25, 2019, which issued as U.S. Pat. No. 10,921,970, which is a Continuation application of Ser. No. 13/963,765 filed on Aug. 9, 2013, which issued as U.S. Pat. No. 10,198,166, which is a Continuation application of Ser. No. 13/133,716 filed on Jun. 9, 2011, which issued as U.S. Pat. No. 8,954,889, which is a National Stage Entry of International Application PCT/JP2009/071080 filed on Dec. 14, 2009, which claims the benefit of priority from Japanese Patent Application No. 2008-321819 filed on Dec. 18, 2008, the disclosures of all of which are incorporated in their entirety by reference herein.

TECHNICAL FIELD

The present invention relates to a slide bar display control device for displaying a slide bar on a screen.

BACKGROUND ART

In recent years, in the field of an electronic apparatus such as a mobile phone device and a portable music player, devices in which a set value such as a volume of sound and a playback position of video data can be changed by operating a slide bar displayed on the screen of a display means having a touch panel using a finger have been increasing.

A slide bar includes a bar part and a slider part. A bar indicates the range of a numerical value that can be set. A slider can be slid in the range of the bar.

A numerical value can be set by moving the slider along the bar. A slider is moved by touching the slider with a fingertip and sliding the fingertip while keeping touching the slider. Such operation is referred to as dragging a slider.

The variation amount of a set value per unit moving distance of a slider is decided roughly by the length of a bar and the range of a numerical value that can be set. For this reason, the shorter the length of a bar which can be indicated is due to restriction of the size of a display screen, the larger a variation amount of a slider per unit moving distance becomes. Similarly, the wider the range of a numerical value that can be set, the larger a variation amount of a slider per unit moving distance becomes. When a variation amount of a set value per unit moving distance is large, the set value increases and decreases greatly only by dragging a slider by a negligible distance. Therefore, operation for adjusting the set value to a desired value becomes difficult.

A technology related to this problem is disclosed in patent document 1, for example. In an input device for audio equipment described in patent document 1, a first bar is displayed on the screen. The first bar is configured by placing a large number of elements, each corresponding to a music number on one-on-one basis, in line. When any part in the first bar is touched by a finger, music numbers corresponding to the touched part and its neighboring parts are obtained. Then, a second bar for selecting one piece of music from the acquired music numbers is indicated. Here, the number of pieces of music that can be selected using the second bar is smaller than the number of pieces of music that can be selected using the first bar. Therefore, the width of one element in the second bar is wider than that of one element in the first bar. Then, an user selects one piece of music which the user desires by touching a desired part in the second bar with a finger.

Patent document 1: Japanese Patent Application Laid-Open No. 2002-230951

DISCLOSURE OF THE INVENTION

Problems to be Solved by the Invention

As it has been mentioned above, when a variation amount of a set value per unit moving distance of a slider is large, operation for fine adjustment of the set value becomes difficult. In patent document 1, a second bar whose variation amount of a set value per unit moving distance is less than that of a first bar is indicated. However, in patent document 1, two times of touch operation, a touch on a desired part in the first bar and a touch on a desired part in the second bar, are needed. Essentially, one of advantages of a slide bar is that, once a slider is touched by a finger, the finger does not have to be released until an adjustment of a setting value is finished. In patent document 1, such essential convenience of a slide bar will be spoiled.

The object of the present invention is to provide a slide bar display control device which can perform a fine adjustment of a set value easily without spoiling the original convenience of a slide bar.

Means for Solving the Problems

The slide bar display control device according to the present invention includes, a display means which indicates a first slide bar including a first slider and a first bar, an input means which can select an arbitrary part of the first slide bar shown on the display means based on touch operation, and a control means which controls the display means and the input means, wherein, when the control means detects that a first operation has been performed in a state that the first slider shown on the display means is being touched in the input means, the display means indicates a second slide bar including a second slider and a second bar, and wherein the second slider is a slider different in a variation amount of a set value per unit moving distance from the first slider.

The slide bar display control method according to the present invention includes a displaying step for indicating a first slide bar including a first slider and a first bar, an input step capable of selecting an arbitrary part of the first slide bar shown on the display means based on touch operation, and a control step for controlling the display step and the input step, wherein, when the control step detects that a first operation has been performed in a state that the first slider shown by the display step is being touched in the input step, the display step indicates a second slide bar including a second slider and a second bar, and wherein the second slider is a slider different in a variation amount of a set value per unit moving distance from the first slider.

An electronic apparatus according to the present invention, when detecting that a first operation has been performed in a state that a slider of a first slide bar displayed on a screen is being touched, displaying a second slide bar with a set value variation amount per unit moving distance of a slider is different from the first slide bar on the screen, and changing a control state to a state that a slider of the second slide bar is being touched from a state that a slider of the first slide bar is being touched.

A recording medium according to the present invention stores a program which carries out an indication step for indicating a first slide bar including a first slider and a first bar, an input step capable of selecting an arbitrary part of the first slide bar shown on the display means based on touch operation, and a control step for controlling the display step and the input step, wherein, when the control step detects that a first operation has been performed in a state that the first slider shown by the display step is being touched in the input step, the display step indicates a second slide bar including a second slider and a second bar, and wherein the second slider is a slider different in a variation amount of a set value per unit moving distance from the first slider.

Advantage of the Invention

According to the present invention, a fine adjustment of a set value can be easily performed without spoiling the original convenience of a slide bar.

DESCRIPTION OF SYMBOLS

Figure 1:
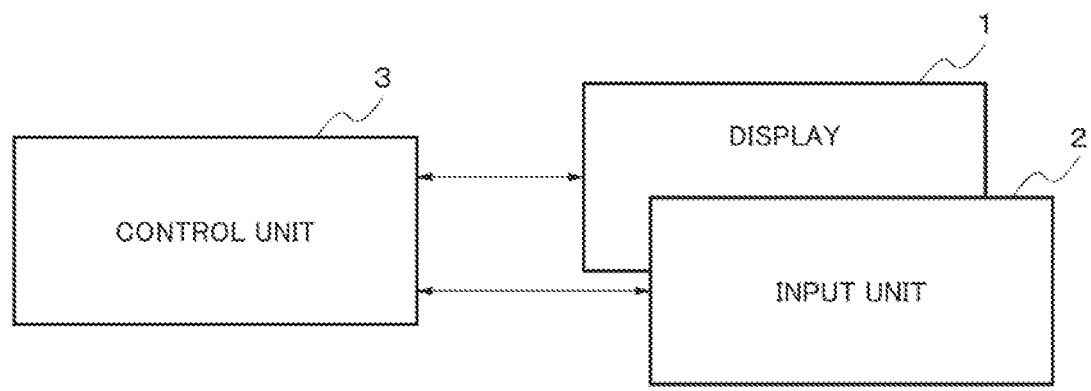
FIG. 1 is a diagram showing an example of a configuration of a slide bar display control device in a first exemplary embodiment of the present invention.

10 Electronic apparatus
11 CPU
12 RAM
13 ROM
14 Flat display panel
15 Touch panel
16 Display controller
17 Coordinate detecting unit
18 Communication unit
19 Input device
20 Output device
21 Input/output interface unit
22 Bus

DESCRIPTION OF EMBODIMENTS

Embodiments of the present invention will be described with reference to the drawings. However, such embodiments do not limit the technical scope of the present invention.

The First Exemplary Embodiment

The first exemplary embodiment of the present invention will be described with reference to FIG. 1.

A slide bar display control device in this exemplary embodiment includes a display 1, an input unit 2 and a control unit 3.

The display 1 indicates a first slide bar including a first slider and a first bar. The display 1 is constituted of a flat display panel, for example. The input unit 2 makes it possible to select any part of the first slide bar shown on the display 1 based on touch operation. The input unit 2 is a clear touch panel which covers the display 1, for example. Touch operation means operation to dab at a touch panel with a fingertip, for example. The control unit 3 controls the display 1 and the input unit 2.

In addition, the control unit 3 detects that first operation has been performed in the state that the first slider displayed on the display 1 is being touched in the input unit 2. When such operation is detected, the display 1 indicates a second slide bar including a second slider and a second bar. Here, a variation amount of a set value per unit moving distance of the second slider is different from a variation amount of a set value per unit moving distance of the first slider.

Meanwhile, the first operation may be operation to keep touching a same position more than a predetermined time, for example. In this case, a slide bar display control device may include a coordinate detecting unit for detecting a position at which the input unit 2 is touched, that is, the coordinate of the touch position. Then, when a coordinate detected by the coordinate detecting unit, that is, a touch coordinate, does not change for more than a predetermined time, it may be determined that the first operation has been performed.

By the above mentioned structure, a slide bar display control device in this exemplary embodiment allows to perform fine adjustment of a set value easily while keeping a state that a finger is touching the input part 3, for example. That is, fine adjustment of a set value can be carried out easily without spoiling the original convenience of a slide bar.

The Second Exemplary Embodiment

Figure 2:
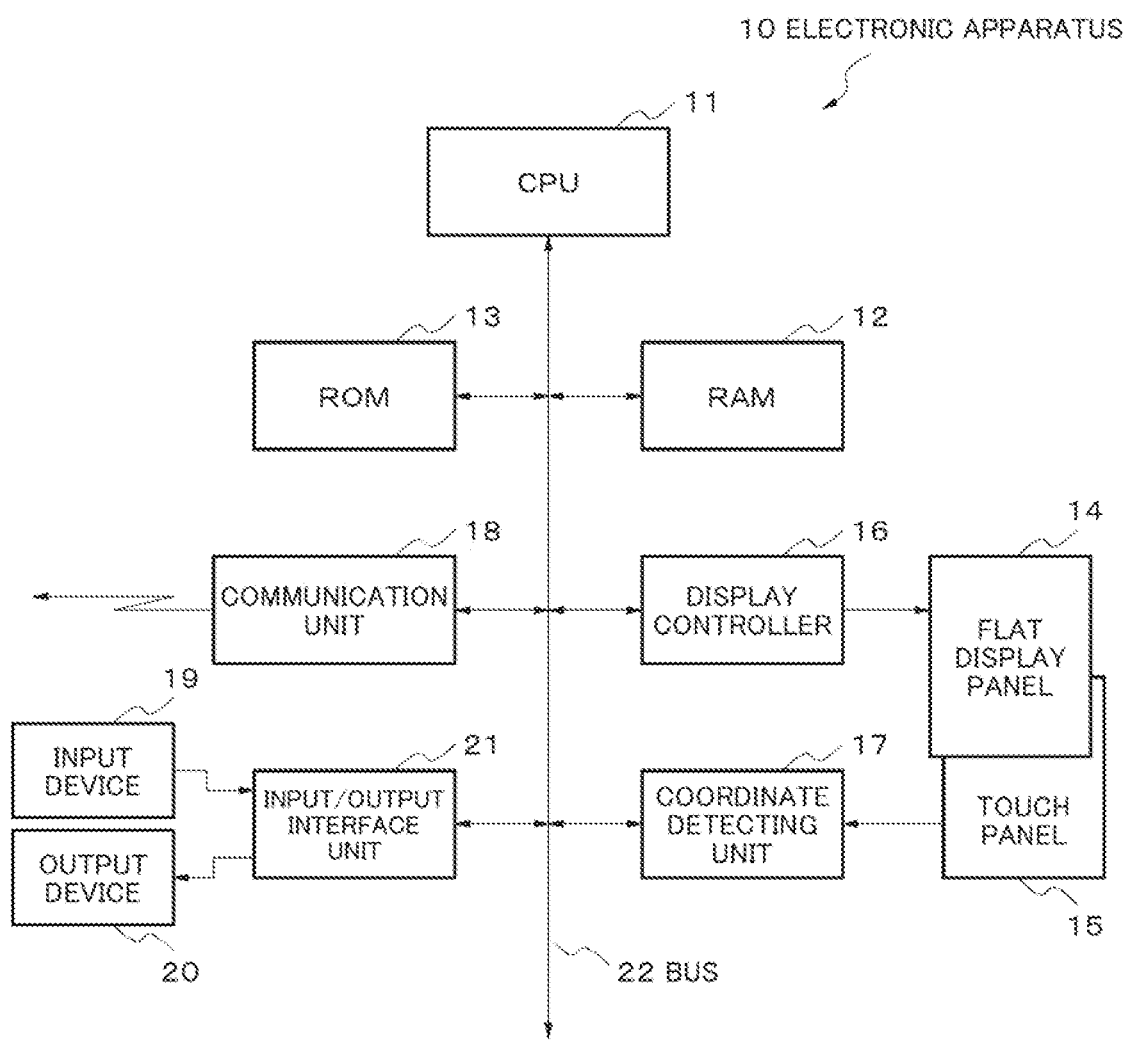
FIG. 2 is a diagram showing an example of a configuration of an electronic apparatus to which the present invention has been applied.

The second exemplary embodiment of the present invention will be described with reference to FIG. 2.

An electronic apparatus 10 in this exemplary embodiment includes a CPU (Central Processing Unit) 11, a RAM (Random Access Memory) 12 and a ROM (Read Only Memory) 13. The electronic apparatus 10 further includes a flat display panel 14, a touch panel 15, a display controller 16, a coordinate detecting unit 17, a communication unit 18, an input device 19, an output device 20, an input/output interface unit 21 and a bus 22.

The CPU 11 controls each kind of processing of the electronic apparatus 10. The RAM 12 functions as a work memory when each kind of processing is carried out. The ROM 13 stores various programs executed by the CPU 11. The display panel 14 is a LCD (Liquid Crystal Display) which can indicate a graphic, for example. The touch panel 15 is clear and covers the display screen of the flat display panel 14. The display controller 16 controls a display state of the flat display panel 14. The coordinate detecting unit 17 detects the coordinate of a touch position of the touch panel 15, that is, a touch coordinate. The communication unit 18 communicates wirelessly or by a wire. The input device 19 is such as a button switch and a key. The output device 20 is a speaker, for example. The input/output interface unit 21 is an input/output interface for the input device 19 and the output device 20. The bus 22 connects each unit of the electronic apparatus 10 mutually.

The CPU 11 carries out a program being stored in the ROM 13 on the ROM 13 or after loading it to the RAM 12. The CPU 11 realizes the various process functions while taking in an input signal from the input device 19 and a touch coordinate of the touch panel 15 from the coordinate detecting unit 17. Meanwhile, an input signal from the input device 19 is taken into the CPU 11 via the input/output interface unit 21. The CPU 11 performs the following kinds of control according to processing results by realization of various process functions. That is, the CPU 11 controls the output device 20 via the input/output interface unit 21. It also controls a display state of the flat display panel 14 via the display controller 16. It further controls communication with outside via the communication unit 18. In this way, the CPU 11 realizes the various functions of the electronic apparatus 10.

As functions of the electronic apparatus 10, there are a voice call function, a mail sending/receiving function, a music playing function and an video playing function, for example. The electronic apparatus 10 in this exemplary embodiment has a media playing function. A playback position of a video and an audio is adjusted using a slide bar. However, of course, kinds of set values adjusted by a slide bar are not limited to this exemplary embodiment.

Figure 3:
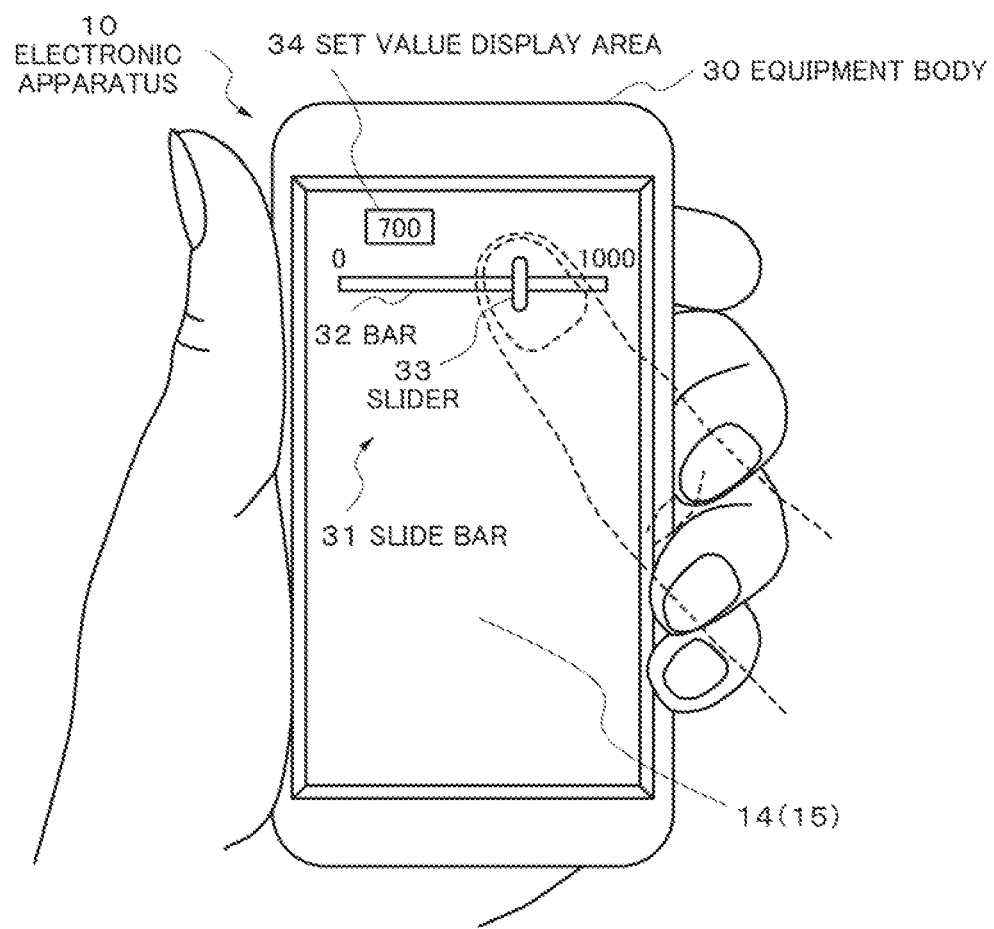
FIG. 3 is a diagram showing a state that a first slide bar is displayed on the display screen of an electronic apparatus to which the present invention has been applied.

An example of the external appearance and an usage state of the electronic apparatus 10 in this exemplary embodiment is shown in FIG. 3. An equipment body 30 of the electronic apparatus 10 shown in FIG. 3 has a thin shape of the degree that it can be held by one hand. The flat display panel 14 with the touch panel 15 is arranged in the front face of the equipment body 30. A slide bar 31 including a bar 32 and a slider 33 is shown on the display screen of the flat display panel 14. Now, a user is adjusting a set value (such as a playback position of media). The "0" shown in the left side of the bar 32 and "1000" shown in the right side of the bar 32, indicates the lower limit value and the upper limit value of the set value that can be adjusted using the slide bar 31, respectively. For example, when the user touches the slider 33 with the fingertip of the index finger of the right hand and drags it in a lengthwise direction of the bar 32, the set value changes according to a position to which the slider 33 has been moved. The present set value is being shown in a set value display area 34, and, in FIG. 3, it is "700". When only a rough adjustment is needed, the fingertip should simply be released from the slider 33 here (this operation is referred to as a release). As a result, the set value is fixed to a numerical value according to the position of the slider 33 at the time the fingertip was released.

Figure 4:
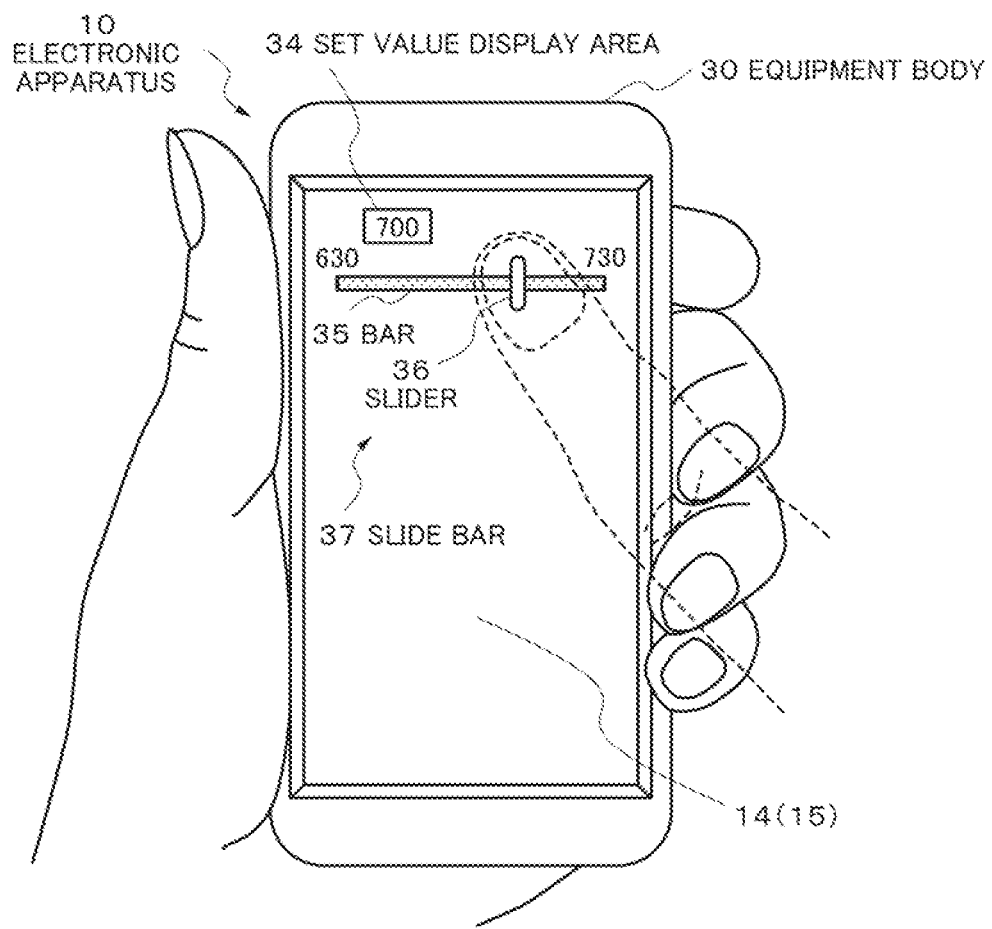
FIG. 4 is a diagram showing a state that a second slide bar is displayed on the display screen of an electronic apparatus to which the present invention has been applied.

However, it is difficult to adjust a set value with a high degree of accuracy using the slide bar 31 having a large set value variation amount per unit moving distance of the slider 33. Accordingly, in this embodiment, when a fingertip which is touching the slider 33 is left without being released and kept just as it is without being moved for a given time (this operation is referred to as a press), the electronic apparatus 10 detects about it. When the electronic apparatus 10 detects that press operation has been performed, it changes the display screen of the flat display panel 14 as shown in FIG. 4. In the display screen of FIG. 4, a slide bar 37 is shown in the same place where the slide bar 31 was indicated. The slide bar 37 has an identical shape with the slide bar 31 that has been displayed on the display screen of FIG. 3 and is different in color from it. The lower limit and upper limit values of the set value that can be adjusted by the slide bar 37 are set based on the set value of the slide bar 31 at the time press operation was performed. In this exemplary embodiment, as shown in both ends of a bar 35, the lower limit and upper limit values of the set value that can be adjusted by this slide bar 37 are 630 and 730, respectively. That is, a variation amount of the set value per the unit moving distance of a slider 36 is one-tenth of the variation amount of the set value per unit moving distance of the slider 33. For this reason, by moving a fingertip which has been kept touching to the screen to drag the slider 36, the set value can be changed between 630 and 730. Then, the fingertip is released from the slider 36 at the position of the slider 36 shown in FIG. 5, for example. As a result, the set value is determined to the numerical value "680" according to the position of the slider 36 at the time the fingertip was released.

Figure 5:
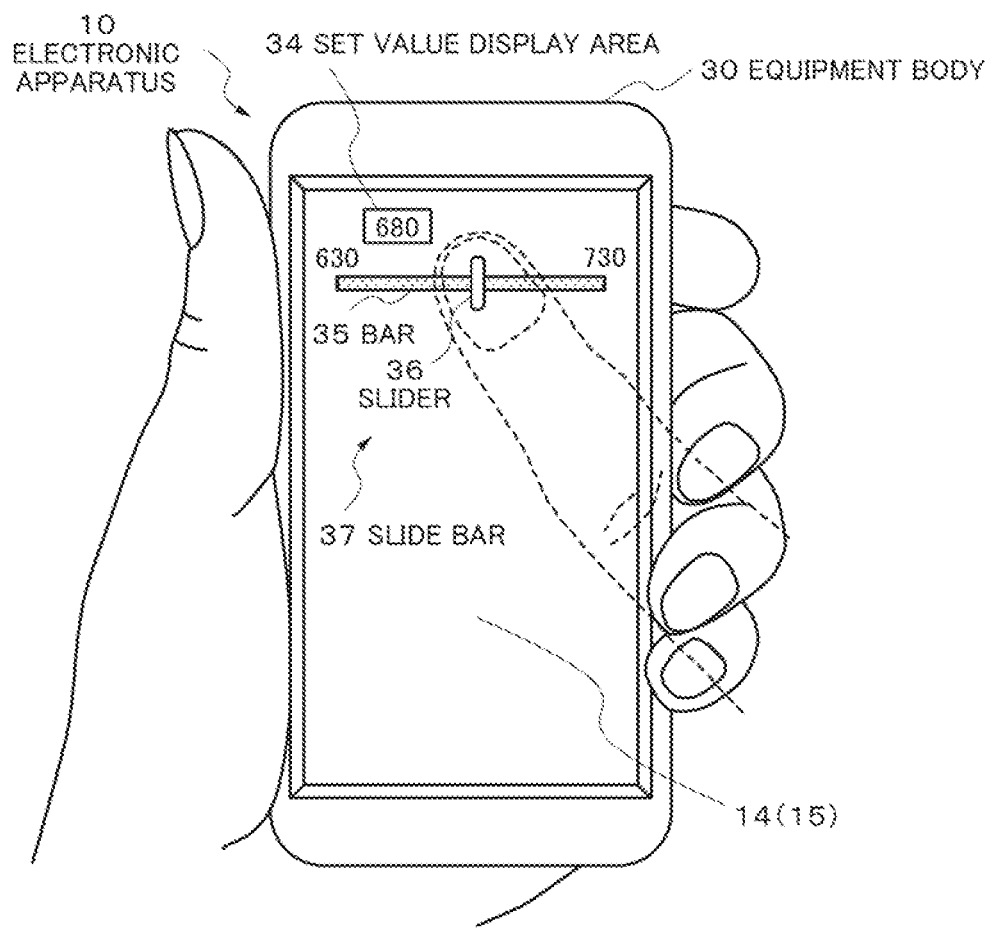
FIG. 5 is a diagram showing a state that the second slide bar is operated in the display screen of an electronic apparatus to which the present invention has been applied to change a set value.
Figure 6:
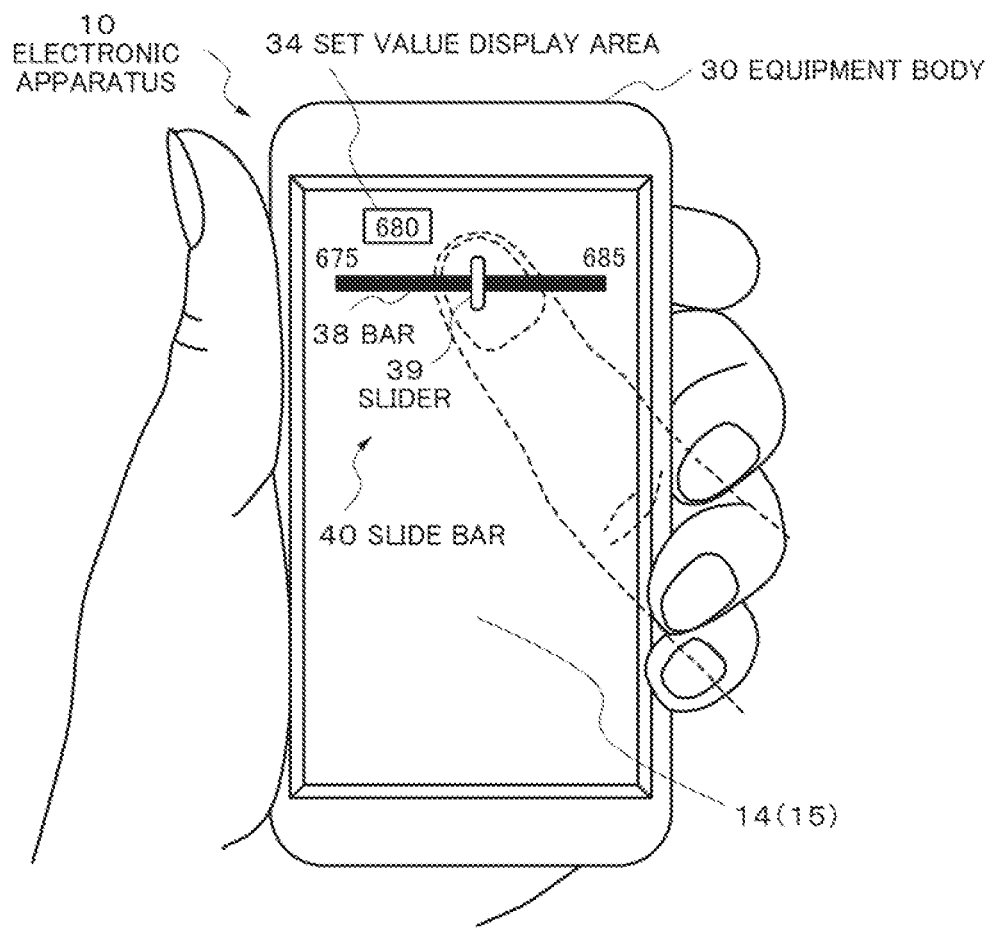
FIG. 6 is a diagram showing a state that a third slide bar is displayed on the display screen of an electronic apparatus to which the present invention has been applied.

In this exemplary embodiment, the variation amount of a set value per unit moving distance of a slider can be made further smaller. That is, when press operation is performed still without releasing a fingertip that is touching the slider 36 at the position of FIG. 5, the electronic apparatus 10 detects about it. As a result, the display screen of the flat display panel 14 is changed as shown in FIG. 6. In the display screen of FIG. 6, a slide bar 40 is shown in the same place where the slide bar 37 has been indicated. The slide bar 40 has an identical shape with the slide bar 37 that has been displayed on the display screen of FIG. 5 and is different in color from it. As shown in both ends of a bar 38, the lower limit and upper limit values of the set value that can be adjusted by this slide bar 40 are 675 and 685, respectively. That is, a variation amount of the set value per the unit moving distance of a slider 39 is one-tenth of the variation amount of the set value per the unit moving distance of the slider 36. For this reason, by moving a fingertip which has been left touching to the screen to drag the slider 36, the set value can be changed between 685 and 675. After being moved, the fingertip is released from a slider 39. As a result, the set value is fixed to a numerical value according to the position of the slider 39 at the time the fingertip was released.

Next, a processing example for realizing the slide bar display control that has been described with reference to FIGS. 3-6 will be described with reference to FIGS. 7-9.

Figure 7:
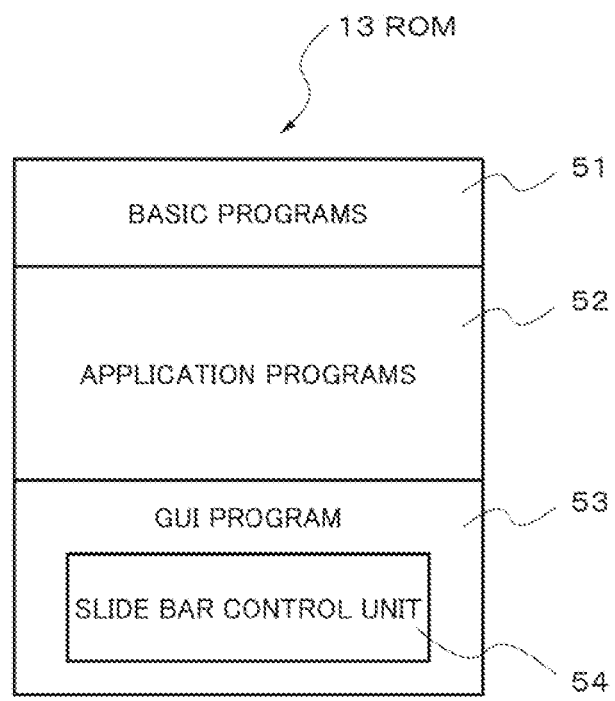
FIG. 7 is an explanatory drawing of software which is stored in a ROM of an electronic apparatus to which the present invention has been applied.

FIG. 7 indicates software recorded in the ROM 13. The ROM 13 records a basic operating system (basic program) 51 and various application programs 52. The ROM 13 further memorizes a GUI (Graphical User Interface) program 53. A slide bar control unit 54 which takes charge of slide bar display control processing according to this exemplary embodiment is incorporated in the GUI program 53.

Figure 8:
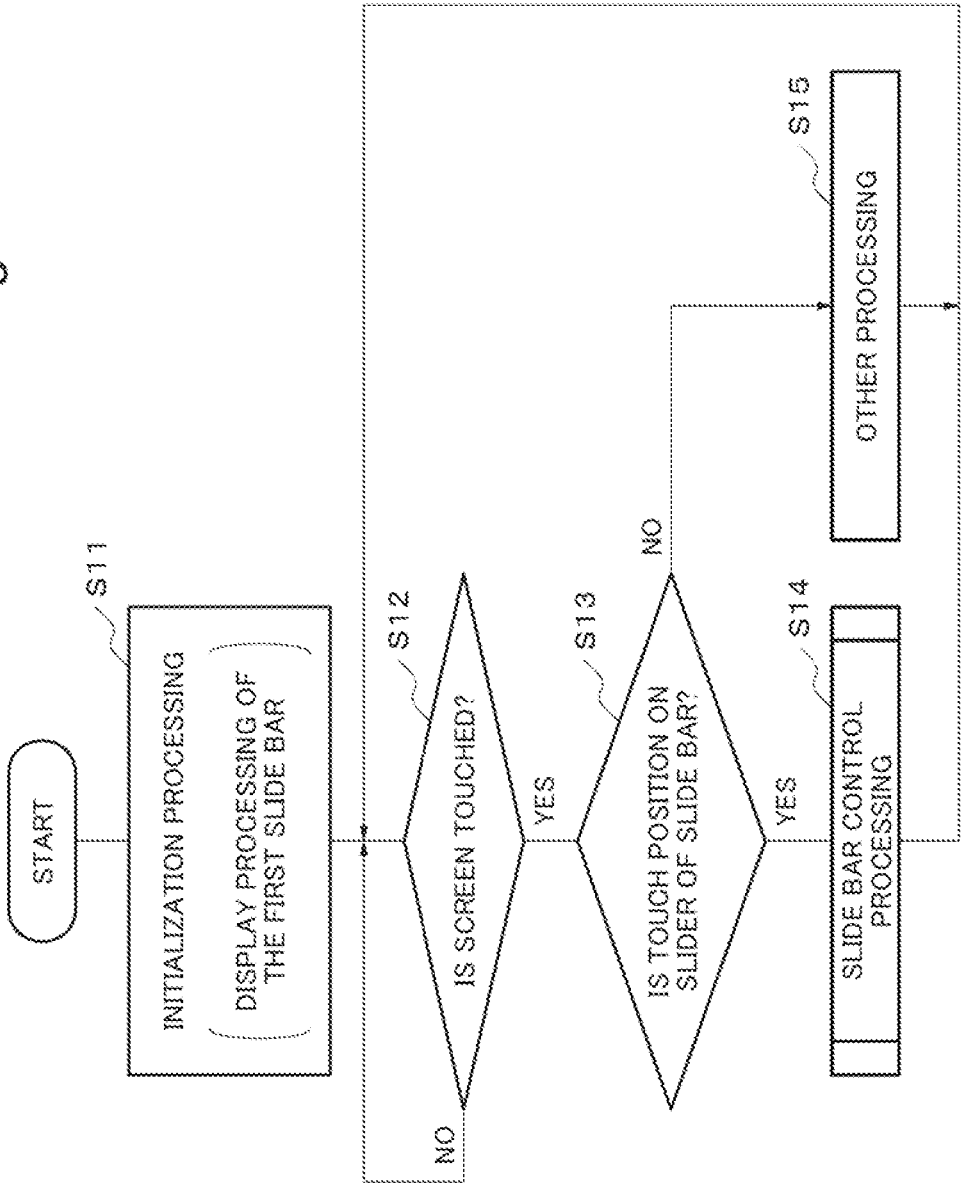
FIG. 8 is a flow chart showing a processing example of a GUI program in a second exemplary embodiment of the present invention.

FIG. 8 indicates a processing example of a GUI program. At the time of start of a set value change function, the GUI program 53 sets an internal variable n for slide bar selection to 1 using the slide bar control unit 54. Then, the slide bar 31 which is the first one is shown on the flat display panel 14 (Step S11). By this, the slide bar 31 as shown in FIG. 3 is shown on the flat display panel 14. At that time, the present set value stored in the RAM 12 is indicated in the set value display area 34. The slider 33 is shown in a position according to the present set value.

Next, the GUI program 53 determines whether a screen touch has been performed or not based on an output coordinate of the coordinate detecting unit 17 (Step S12). When a screen touch has been performed, it determines whether a touch position is on the slider 33 of the slide bar 31 (Step S13). When the touch position is on the slider 33, the slide bar control unit 54 carries out a slide bar control processing step S14. After the end of Step S14, processing returns to the processing of Step S12. On the other hand, when the touch position is a position besides the slider 33, processing according to the touch position is performed (Step S15). Then, after Step S15 has been finished, processing returns to the processing of Step S12. Because processing when a position besides the slider 33 has been touched is not related to the present invention directly, detailed description will be omitted.

Figure 9:
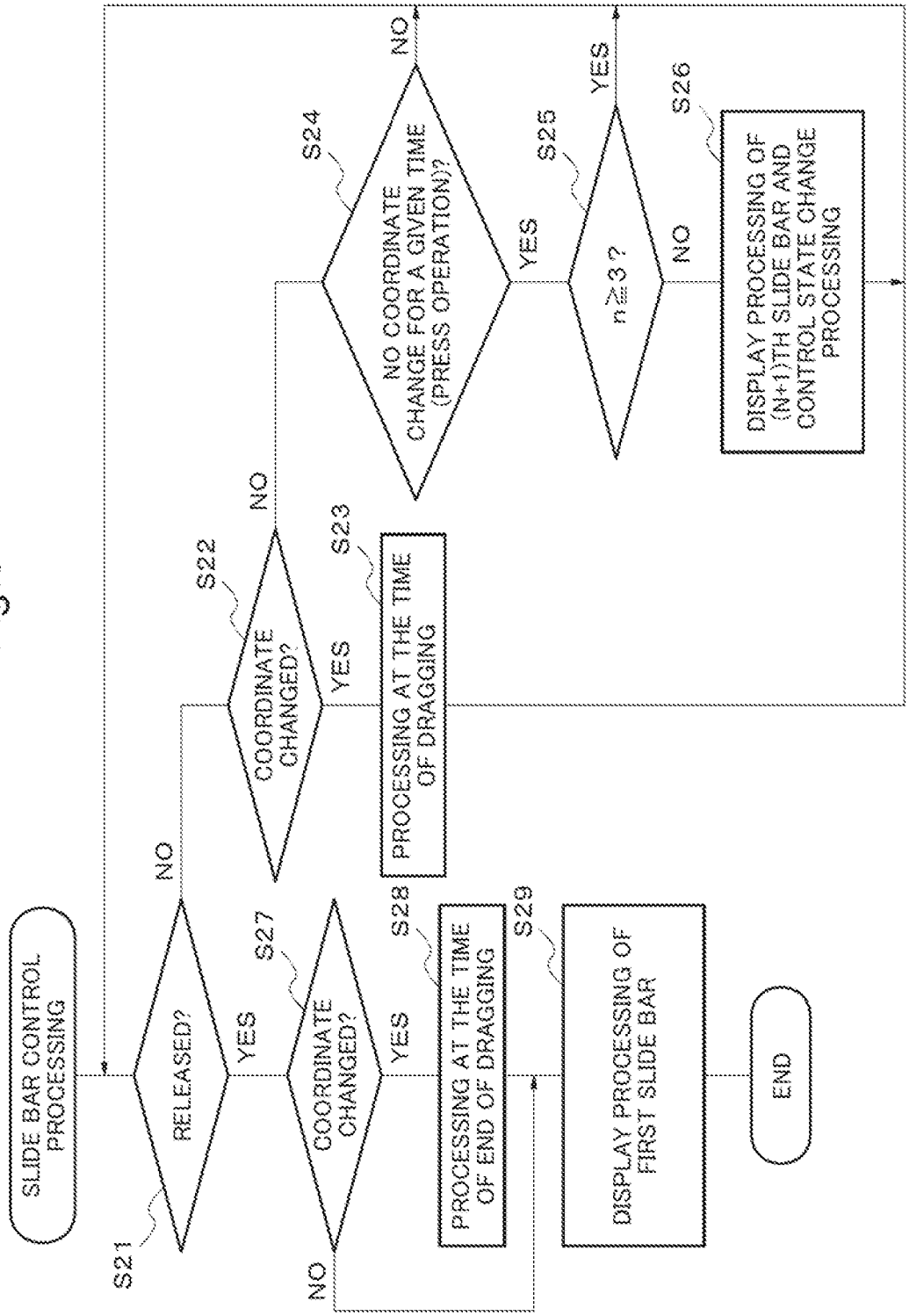
FIG. 9 is a flow chart showing an example of slide bar control processing in the second exemplary embodiment of the present invention.

FIG. 9 indicates an example of slide bar control processing (Step S14) of FIG. 8. In the slide bar control processing of Step S14, first, whether a finger has been released from the slider 33 that had been being touched by the finger or not is determined based on output of the coordinate detecting unit 17 (Step S21). When it has not being released, whether there has been a change in a touch coordinate is determined (Step S22). When there is a change in a touch coordinate, processing at the time of dragging is performed (Step S23). The processing at the time of dragging includes processing for moving a display position of the slider 33 to the dragged position. Also included is processing for calculating a set value corresponding to a position of the slider 33 after a move. Moreover, processing for indicating such calculated set value corresponding to the position of the slider 33 after the move to the set value display area 34 is also included. Yet further, when a specification is such that a set value in the middle of changing is immediately reflected to an application using the set value, processing for updating the set value stored in the RAM 12 is also included.

On the other hand, when there are no changes in a touch coordinate (in Step S22, NO), whether a touch coordinate have not changed for more than a given time or not, in other words, whether press operation has been performed or not is determined (Step S24). When press operation has not been performed, processing returns to the processing of Step S21. On the other hand, when press operation has been performed, it is determined that switching of slide bars is directed from the user. Then, after it has been confirmed that an internal variable n is not 3 or more (Step S25), 1 is added to the internal variable n to and make it be n+1. Then, when n+1 is 2, for example, the second slide bar 37 is displayed on the screen of the flat display panel 14 (Step S26). As a result, the display screen transits from the state of FIG. 3 to the state of FIG. 4. At that time, the slider 36 of the new slide bar 37 is shown in the position where the slider 33 of the original slide bar 31 has been indicated. Therefore, the fingertip that has been touching the slider 33 will be in the state that it is touching the slider 36. Along with this, in Step S26, the slide bar control unit 54 of the GUI program 53 changes the control state. That is, the slide bar control unit 54 changes the control state from the state it is recognizing that the slider 33 is being touched to the state it is recognizing that the slider 36 is being touched. Then, processing returns to the processing of Step S21.

Similarly to the case where the slide bar 31 is being indicated, whether the slider 36 has been released or not is determined also in the state where the slide bar 37 is being indicated (Step S21). When it has not been released, whether the touch coordinate has been changed or not is determined (Step S22). Further, when the touch coordinate has not been changed, whether press operation has been performed or not is determined (Step S24). Based on these determination results, processing at the time of dragging (Step S23), processing for changing the display to the third slide bar 40 and processing for changing the control state (Step S26) is carried out.

Next, a case when release of a slider is detected in the state where one of the first to third slide bars is being indicated (in Step S21, YES) will be described. In this case, when there is a change between a coordinate of the slider as of the end of the last dragging and a touch coordinate of the time when the slider was released (in Step S27, YES), processing at the time of the end of dragging is performed (Step S28). The processing at the time of the end of dragging includes processing for calculating a set value from the kind of a slide bar and a position of the slider at the time of the end of dragging. Additionally, processing for indicating such calculated set value in the set value display area 34 as a final set value is also included. Moreover, processing for updating a set value stored in the RAM 12 to the calculated set value is also included. After that, an internal variable n is returned to the initial value, 1, just like the processing in Step S11 of FIG. 8. The first slide bar 31 is displayed on the screen (Step S29), and slide bar control processing of FIG. 9 is ended.

On the other hand, when there is not a difference between a coordinate of the slider as of the end of the last dragging and a touch coordinate at the time when the slider was released (in Step S27, NO), the following processing is performed. That is, processing of Step S29 is performed while skipping the processing of Step S28, and the slide bar control processing of FIG. 9 is ended.

Next, a method to determine an upper limit value and a lower limit value of a slide bar that will be indicated newly in Step S26 will be described. The lower limit and upper limit values of a slide bar indicated newly are given by the following formula.

$$\text{Lower limit value} = X - W \times (a/L) \quad (1)$$

$$\text{Upper limit value} = X + W \times (b/L) \quad (2)$$

Here, X is a set value just before switching slide bars, that is, just before indicating a new slide bar. W is a range of a set value of a slide bar indicated newly, within which the value can be changed. L is the total length of the bar of a slide bar indicated newly. Also, let a be the length from the slider of the newly indicated slide bar to the left end of the bar and b be the length from that slider to the right end of the bar when the slider of the slide bar indicated newly is indicated in the same position as the slider of the original slide bar.

For example, as shown in FIG. 3, when indication is switched from the slide bar 31 to the slide bar 37 in the state the set value is "700", X is 700. Here, the slider 36 is indicated in the position of the slider 33 of the original slide bar. Therefore, given that the length L of the bar 35 of the slide bar 37 is 60 mm, the distance from the slider 36 to the left end of the bar 35 is 42 mm and the distance to the right end is 18 mm. Accordingly, assuming that the possible change range W of the set value of the slide bar 37 is 100, the lower limit and the upper limit values are as follows. That is, the lower limit value will be 700−100×(42/60)=630. The upper limit value will be 700+100×(18/60)=730. Meanwhile, although the unit of distance is mm in this exemplary embodiment, the present invention is not limited to this. That is, the unit of distance is discretionary and it may be the number of dots of indication, for example.

As above, in this exemplary embodiment, when press operation (operation to keep touching the screen more than a given time without moving a slider) is performed, a slide bar having a set value variation amount per unit moving distance of the slider less than that of the original slide bar is indicated newly while holding the present set value. Then, adjustment of the setting value can be continued by the slide bar indicated newly. Therefore, fine adjustment of the set value can be carried out easily.

In addition, according to this embodiment, once a slider is touched by a finger, a series of operation can be performed without releasing the finger until an adjustment of a set value is finished. Therefore, the essential ease of use of a slide bar is not damaged. Moreover, operation of a slide bar without seeing the slide bar also becomes possible.

The Third Exemplary Embodiment

In an electronic apparatus of the second exemplary embodiment, when a set value is adjusted by a user, switching to a slide bar with a less set value variation amount per unit moving distance of a slider is available. On the other hand, in this embodiment, reverse switching, that is, switching to a slide bar with a larger set value variation amount per unit moving distance of a slider becomes also possible.

Specifically, for example, in the display screen of FIG. 6, there is shown the slide bar 40 with the lower and upper limit values of a set value that can be adjusted of 675 and 685, respectively. Here, when the user performs operation to direct switching to a slide bar with a larger variation amount while keeping touching the slider 39, the electronic apparatus 10 detects the operation. Then, the display screen of the flat display panel 14 is changed to a screen which indicates the slide bar 37 as shown in FIG. 5. As a result, the user can change a set value between 630-730 by moving a fingertip which has been left touching the screen to drag the slider 36.

In the display screen of FIG. 4, for example, there is indicated the slide bar 37 whose lower limit and upper limit values of a set value that can be adjusted are 630 and 730, respectively. Here, when the user performs operation which directs switching to a slide bar with a larger variation amount while keeping touching the slider 36, the electronic apparatus 10 detects the operation. The display screen of the flat display panel 14 is changed to a screen which indicates the slide bar 31 as shown in FIG. 3. As a result, the user can change the set value between 0-1000 by dragging the slider 33 by moving the fingertip which has been left touching the screen.

That is, in this exemplary embodiment, both of switching to a slide bar with a less set value variation amount per unit slider moving distance and switching to a slide bar with a larger set value variation amount per unit slider moving distance are realized.

Figure 10:
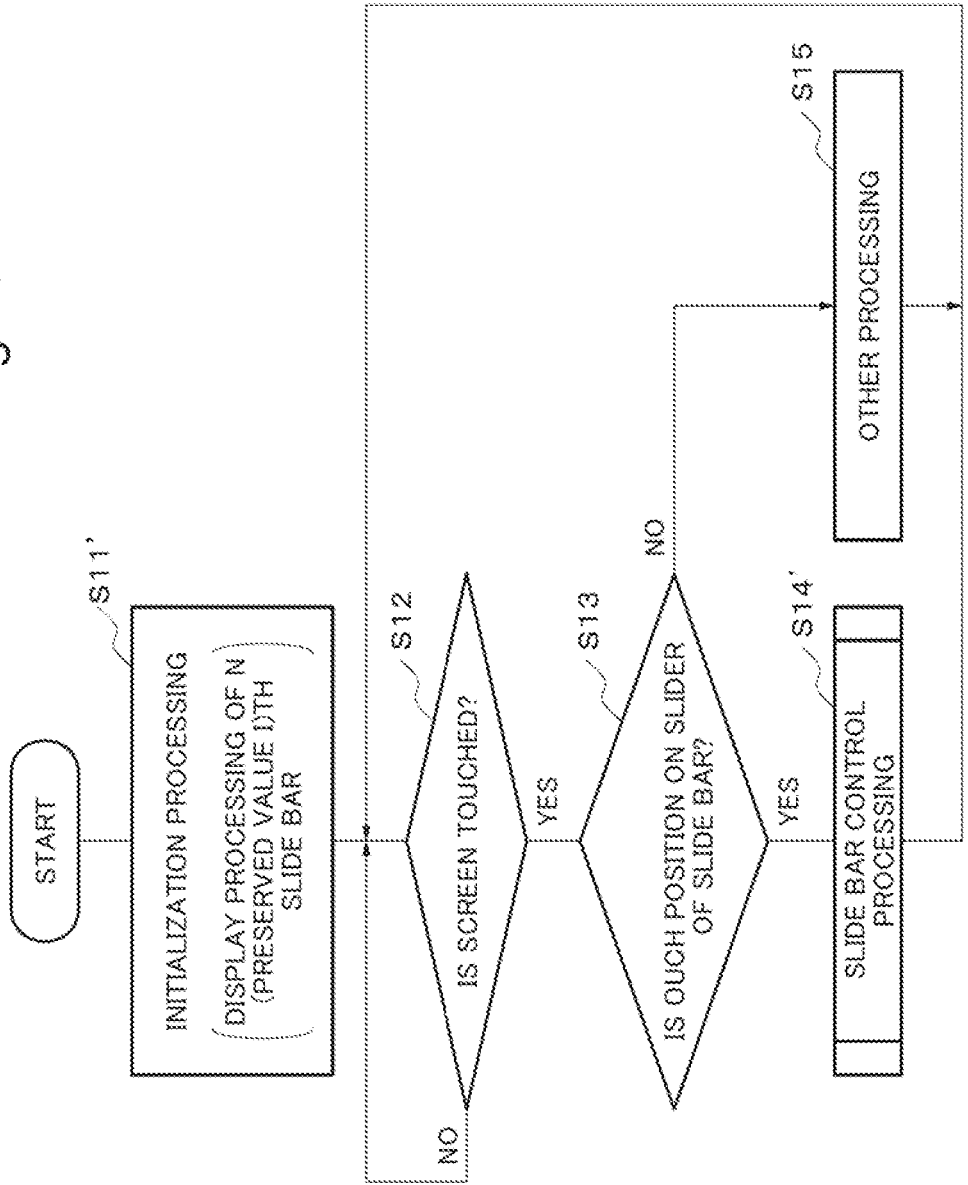
FIG. 10 is a flow chart showing a processing example of a GUI program in a third exemplary embodiment of the present invention.

A processing example of the GUI program 53 in this exemplary embodiment will be described with reference to FIG. 10.

At the time of a start of a set value change function, the GUI program 53 sets the internal variable n for slide bar selection to a numerical value i preserved in the RAM 12 using the slide bar control unit 54. Then, the nth slide bar is indicated on the flat display panel 14 (step S11'). Here, the preserved value i is a numerical value which indicates a slide bar used last at the time of last set value change among the first to third slide bars. At that time, the present set value stored in the RAM 12 is shown in the set value display area 34. Also, simultaneously with this, a slider is indicated in a position according to the present set value.

Next, the GUI program 53 determines whether a screen touch has been performed or not based on an output coordinate of the coordinate detecting unit 17 (Step S12). When a screen touch has been performed, whether a touch position is on the slider of the slide bar or not is determined (Step S13). When the touch position is on the slider, the slide bar control unit 54 carries out the slide bar control processing (step S14'). After that, processing returns to the processing of Step S12. On the other hand, when the touch position is a portion besides the slider, processing according to the touched position is carried out (Step S15). After that, processing returns to the processing of Step S12. Because the processing when a portion besides the slider has been touched is not related to the present invention directly, detailed description will be omitted.

Figure 11:
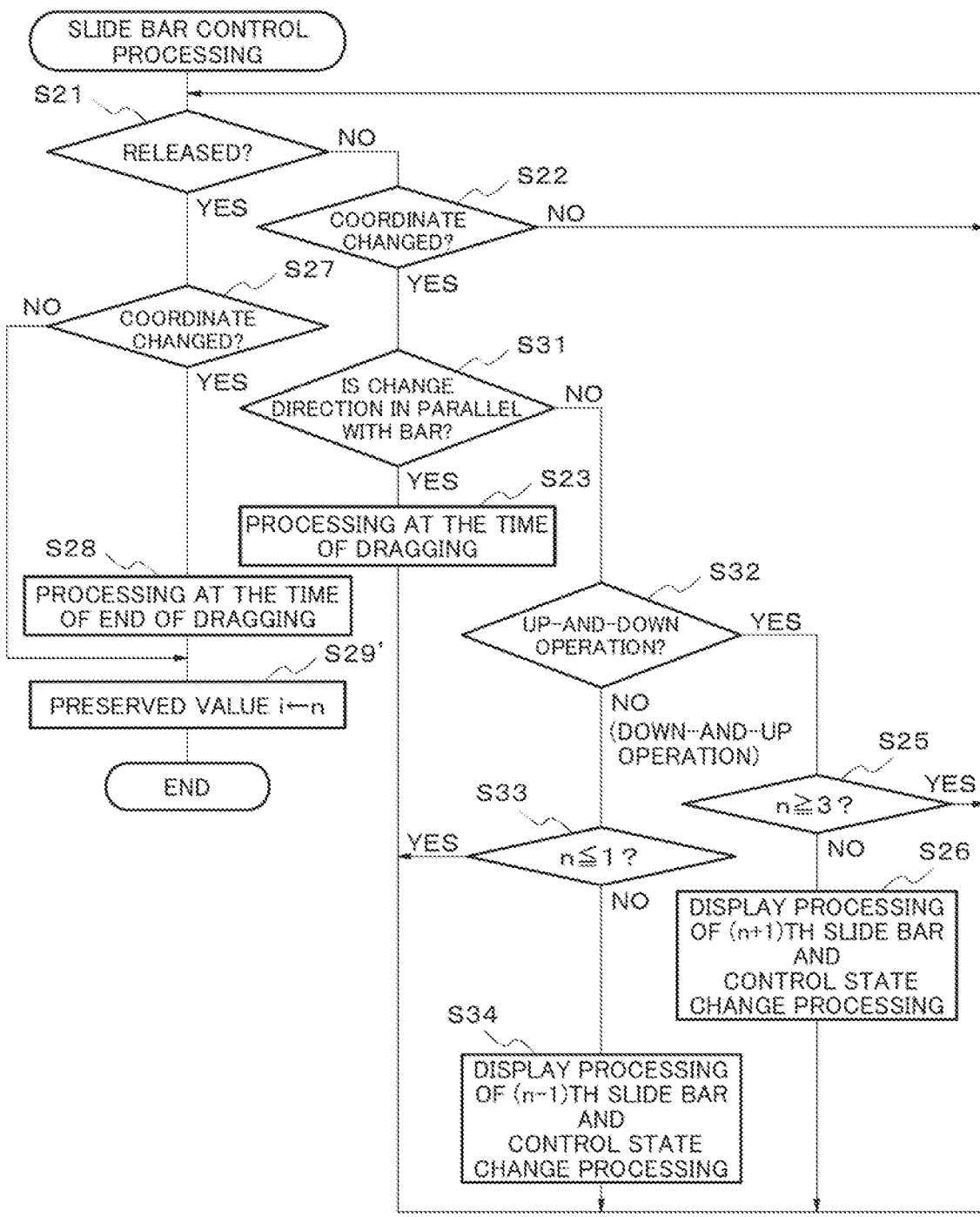
FIG. 11 is a flow chart showing an example of slide bar control processing in the third exemplary embodiment of the present invention.

Next, slide bar control processing in this exemplary embodiment, that is, slide bar control processing in FIG. 10 (step S14') will be described with reference to FIG. 11.

In the slide bar control processing of step S14', first, whether a finger has been released from a slider that had been being touched by it or not is determined based on output of the coordinate detecting unit 17 (Step S21). When it has not being released, whether there has been a change in a touch coordinate is determined (Step S22). When there are no changes in the touch coordinate, processing returns to the processing of Step S21.

On the other hand, when there is a change in the touch coordinate, whether the change direction is a direction parallel to the bar or a direction vertical to the bar is distinguished (Step S31). When the change direction is a direction parallel to the bar, processing at the time of dragging is performed (Step S23). The processing at the time of dragging includes processing for moving a display position of the slider to the position in which dragging has been performed. Also included is processing for calculating a set value corresponding to the position of the slider after it has been moved is also included. Moreover, processing for indicating the calculated set value after the move in the set value display area 34 is also included. In addition, when a specification is such that a set value in the middle of changing is immediately reflected to an application using the set value, processing for updating the set value stored in the RAM 12 is also included.

Figure 12A:
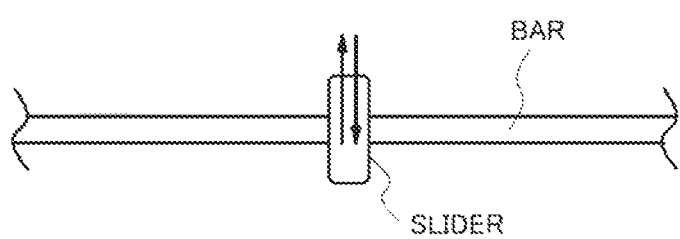
FIG. 12(a) is an explanatory drawing of up-and-down operation and FIG. 12(b) is an explanatory drawing of down-and-up operation, the both being instruction operation for slide bar switching in the third exemplary embodiment of the present invention.
Figure 12B:
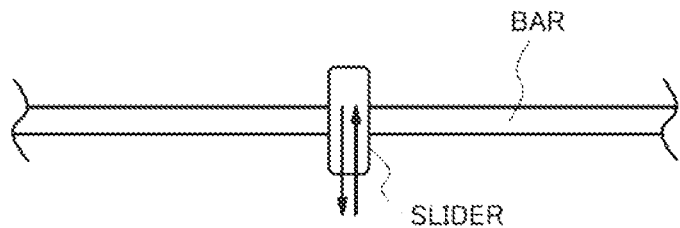

Next, the case when the change direction of the touch coordinate is a direction vertical to the bar will be described (in Step S31, NO). In this case, whether up-and-down operation has been performed and whether down-and-up operation has been performed is determined (Step S32). Up-and-down operation is operation, as shown in FIG. 12(*a*), to rub a slider slightly in a direction from the lower part of the screen toward the upper part thereof while keeping touching the slider, and, after that, to return to the original position. Down-and-up operation is operation, as shown in FIG. 12(*b*), to rub a slider slightly in a direction from the upper part of the screen toward the lower part thereof while keeping touching the slider, and then, to return to the original position.

When up-and-down operation has been performed, it is determined that switching to a slide bar with a less set value variation amount per unit moving distance of a slider has been directed from the user. Then, it is confirmed that the internal variable n is not 3 or more (Step S25). After that, 1 is added to the internal variable n, and the (n+1)th slide bar is displayed on the screen of the flat display panel 14 (Step S26). At that time, the slider of a new slide bar is indicated in the position where the slider of the original slide bar has been indicated. Therefore, the fingertip that has been touching the original slider will be in the state that it is touching the new slider. Also in the same Step S26, the slide bar control unit 54 of the GUI program 53 changes the control state. That is, the slide bar control unit 54 changes the control state from the state it is recognizing that the original slider is being touched to the state it is recognizing that the new slider is being touched. After that, processing returns to the processing of Step S21.

On the other hand, when down-and-up operation has been performed, it is determined that switching to a slide bar with a larger set value variation amount per unit moving distance of a slider has been directed from the user. Then, it is confirmed that the internal variable n is not 1 or less (Step S33). After that, 1 is subtracted from the internal variable n, and the (n−1)th slide bar is displayed on the screen of the flat display panel 14 (Step S34). At that time, the slider of a new slide bar is indicated in the portion where the slider of the original slide bar has been indicated. Therefore, the fingertip that has been touching the original slider will be in the state that it is touching the new slider. Also in the same Step S34, the slide bar control unit 54 of the GUI program 53 changes the control state. That is, the slide bar control unit 54 changes the control state from the state it is recognizing that the original slider is being touched to the state it is recognizing that the new slider is being touched. After that, processing returns to the processing of Step S21.

Next, a case when release of a slider is detected in the state where one of the first to third slide bars is being indicated (in Step S21, YES) will be described. In this case, whether there is a change between the coordinate of the slider as of the end of the last dragging and a touch coordinate of the time when the slider was released is determined (Step S27). When being determined that there is a change (in Step S27, YES), processing at the time of the end of dragging is performed (Step S28). The processing at the time of the end of dragging includes processing for calculating a set value from the kind of the slide bar and the position of the slider as of the end of dragging. Processing for indicating such calculated set value in the set value display area 34 as a defined set value is also included. Moreover, processing for updating the set value stored in the RAM 12 to the calculated set value is also included. After that, the numerical value of the present internal variable n is stored in the RAM 12 as a preserved value i (step S29'). Then, slide bar control processing of FIG. 11 is ended. On the other hand, when there is not a change between a coordinate of the slider as of the end of the last dragging and a touch coordinate of the time when the slider was released (in Step S27, NO), processing is as follows. That is, in this case, processing of Step S29' is performed while skipping the processing of Step S28. Then, slide bar control processing of FIG. 11 is ended.

Next, the effects of this embodiment will be described.

According to this exemplary embodiment, the same effect as the second exemplary embodiment is obtained. Moreover, in this exemplary embodiment, by predetermined operation performed while keeping touching a slider, switching to a slide bar with a larger set value variation amounts per unit moving distance of a slider also becomes possible. Therefore, it becomes possible to carry out a fine adjustment of a set value more efficiently.

Other Embodiments

<The Kinds of Operation>

Figure 13:
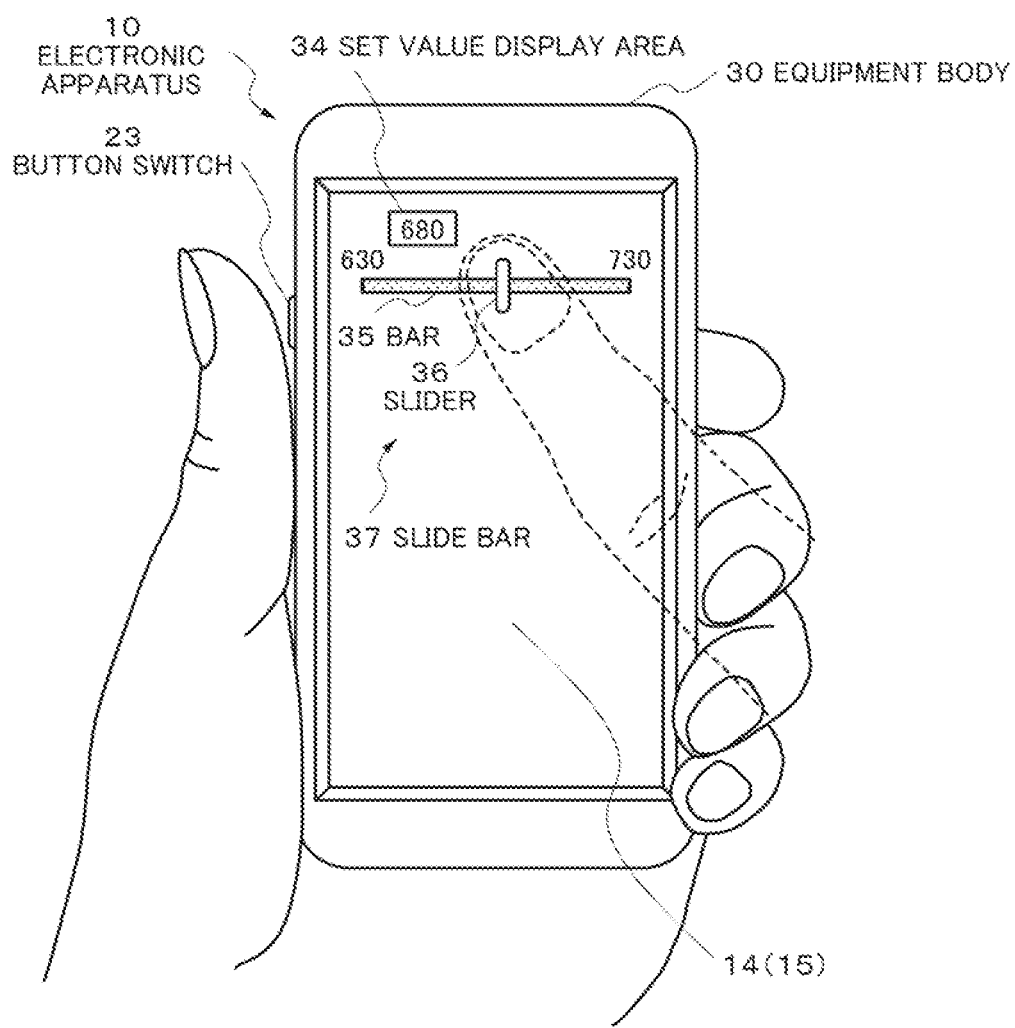
FIG. 13 is an explanatory drawing of an embodiment for switching slide bars by operation of a button switch.

As instruction operation for switching to a slide bar with a less set value variation amount per unit moving distance of a slider, press operation is used in the second exemplary embodiment and up-and-down operation is used in the third exemplary embodiment, but the present invention is not limited to these. That is, for example, a button switch 23 which can be operated by such as a thumb of a hand holding the electronic apparatus 10 may be provided in a side wall of the equipment body 30 as shown in FIG. 13. Then, operation to push this button switch 23 may be assigned to instruction operation for switching to a slide bar with a less variation amount. Further, a physical switch like the button switch 23 does not have to be used. That is, operation to turn on a software switch displayed on the display screen of the flat display panel 14 may be assigned to instruction operation for switching slide bars. In short, any operation is acceptable, provided that the operation can be performed while keeping touching a slider.

For example, press operation which is carried out when the button switch 23 is OFF may be made be instruction operation for switching to a slide bar with a less variation amount. Also, press operation which is made when the button switch 23 is ON may be made be instruction operation for switching to a slide bar with a large variation amounts. In short, any two kinds of operation are acceptable, provided that the two kinds of operation can be performed while keeping touching a slider.

<The Number of Switching Steps>

Although, according to the first and third exemplary embodiments, the number of switching stages of slide bars is set to three stages, but the present invention is not limited to this. That is, these exemplary embodiments can be applied to cases where two stages or four or more stages of slide bar switching are performed.

<The Shape of a Slide Bar>

Figure 14A:
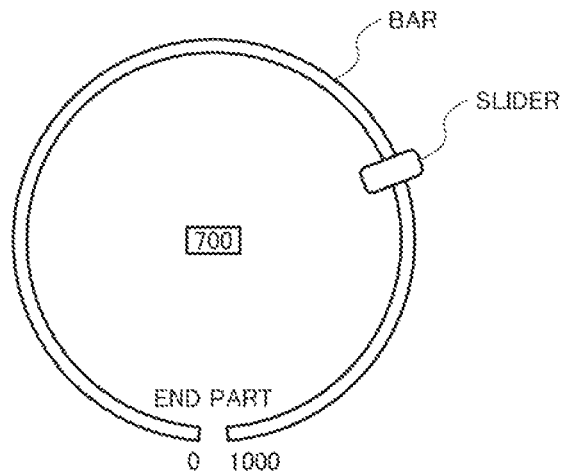
FIG. 14(a) is an explanatory drawing of an embodiment using a slide bar with a ring-like bar in which a position in the ring-like bar is broken away and made be end part.
Figure 14B:
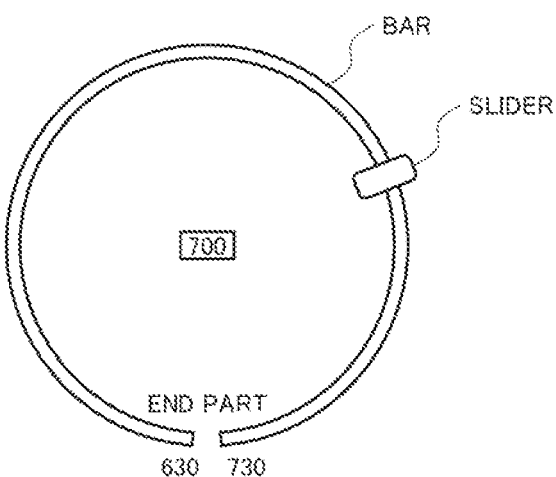
FIG. 14(b) is an explanatory drawing different from FIG. 14(a) of an embodiment using a slide bar with a ring-like bar.
Figure 14C:
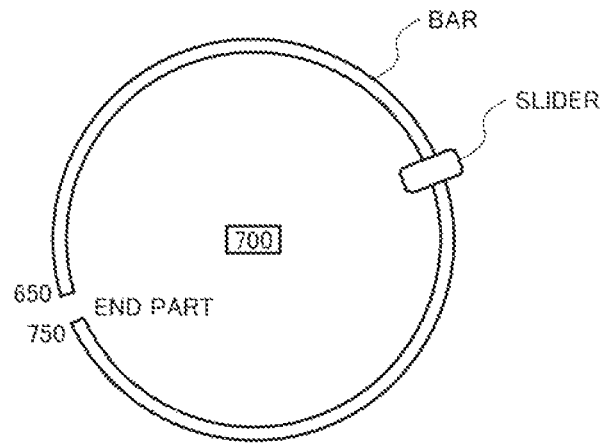
FIG. 14(c) is an explanatory drawing different from FIG. 14(b) of an embodiment using a slide bar with a ring-like bar.

Although, according to the first and third exemplary embodiments, slide bars having a bar with a linear shape is used, the present invention is not limited to this. That is, a bar may be of a polygonal line and a curve line. In FIG. 14, examples of a slide bar with a ring-like shaped bar are shown. In the slide bars shown in FIG. 14, a position in a ring-like bar is broken away and made be the end part. In FIG. 14(*a*), by starting from the lower limit value of 0 and moving the slider clockwise, a set value increases gradually. When it makes a circuit and reaches the other end, it becomes the upper limit value of 1000. FIG. 14(*b*) is a display example of a slide bar which has a reduced set value variation amount per unit moving distance of a slider compared with the slide bar of FIG. 14(*a*). FIG. 14(*c*) is a display example of a form different from FIG. 14(*b*). In FIG. 14(*c*), the position of the end part of a slide bar is made be variable. Further, the lower limit and the upper limit values are set making a position rotating 180 degrees from the position of the slider at the time accepting a switching instruction of slide bars be a new end. Compared with the slide bar of FIG. 14(*b*), the slide bar of FIG. 14(*c*) has an advantage that an available change range that takes the present set value as the median can be set.

<The Forms of Slide Bars Before and After Switching>

According to the second and third exemplary embodiments, a slide bar after switching is indicated so that it may overlap with the slide bar before switching completely, but the present invention is not limited to this. That is, for example, there may be a difference between display forms of slide bars before and after slide bar switching.

Figure 15:
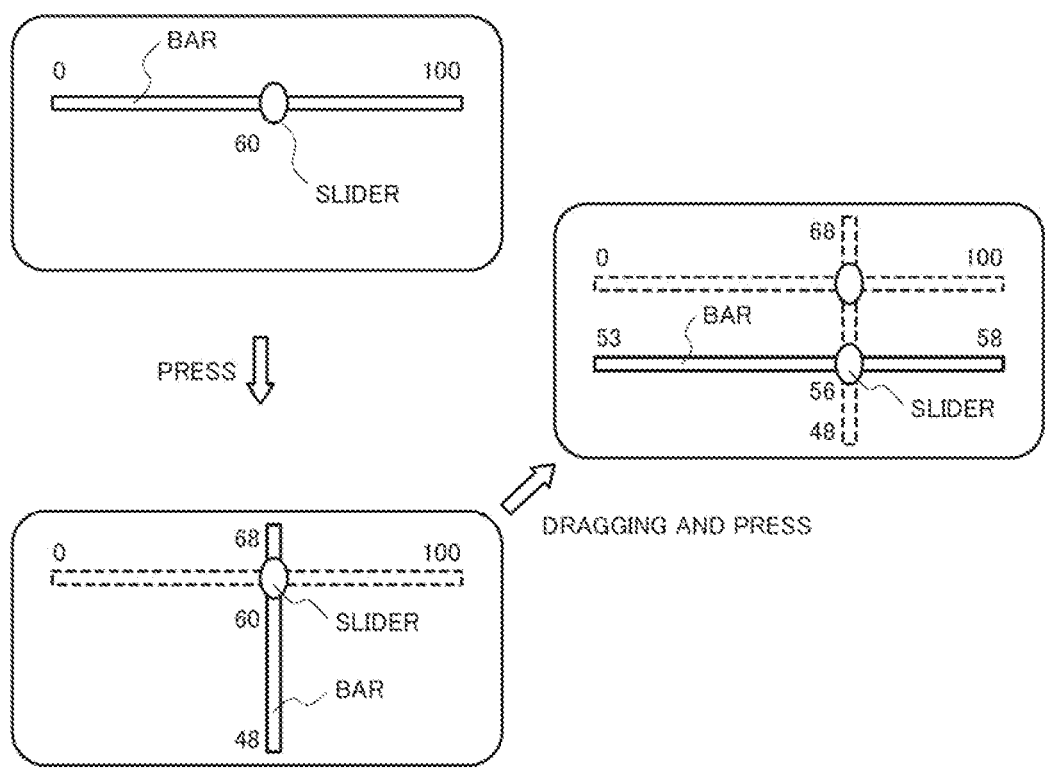
FIG. 15 is an explanatory drawing of an embodiment in which a new bar is indicated perpendicular to the original bar when slide bars are switched.

Specifically, a slide bar after switching may be indicated in a different place from the slide bar before the switching within a range that the display positions of sliders being touched do not differ between before and after the switching, for example. In this case, a new slide bar with a bar of a different direction from the direction of the bar of the original slide bar may be indicated. An example is shown in FIG. 15. In FIG. 15, when press operation has been performed to a slider of a slide bar having a bar with the lower limit value of 0 and the upper limit value of 100, indication will be as follows. That is, screen displayed is performed in a manner that a new slide bar having a bar perpendicular to the original bar is indicated such that the old and new sliders are indicated at the same position. The bar of this new slide bar has the lower limit value of 48 and the upper limit value of 68.

Further, when dragging and press operation is performed to the slider of this new slide bar, indication will be as follows. That is, screen display is carried out in a manner that a new slide bar having a bar perpendicular to the present bar is indicated such that the old and new sliders are indicated at the same position. The bar of this new slide bar has the lower limit value of 53 and the upper limit value of 58. Further, in this case, the old slide bar may be left on the screen or may be eliminated.

Meanwhile, although, in the example of FIG. 15, the bar of a new slide bar after slide bar switching is made always be perpendicular to the original bar, the present invention is not limited to this. That is, whether a new bar is indicated such that it is overlapped on the original bar like the second exemplary embodiment, or whether a new bar is indicated such that it is perpendicular to the original bar as shown in FIG. 15 may be determined according to some kind of standards. For example, the standard is such that an option with a smaller difference between the lengths to the both ends of a new bar from the new slider is selected. By having this standard, a certain degree of adjustment range can be secured both in the direction for making a set value large and in the direction for making it small.

Figure 16:
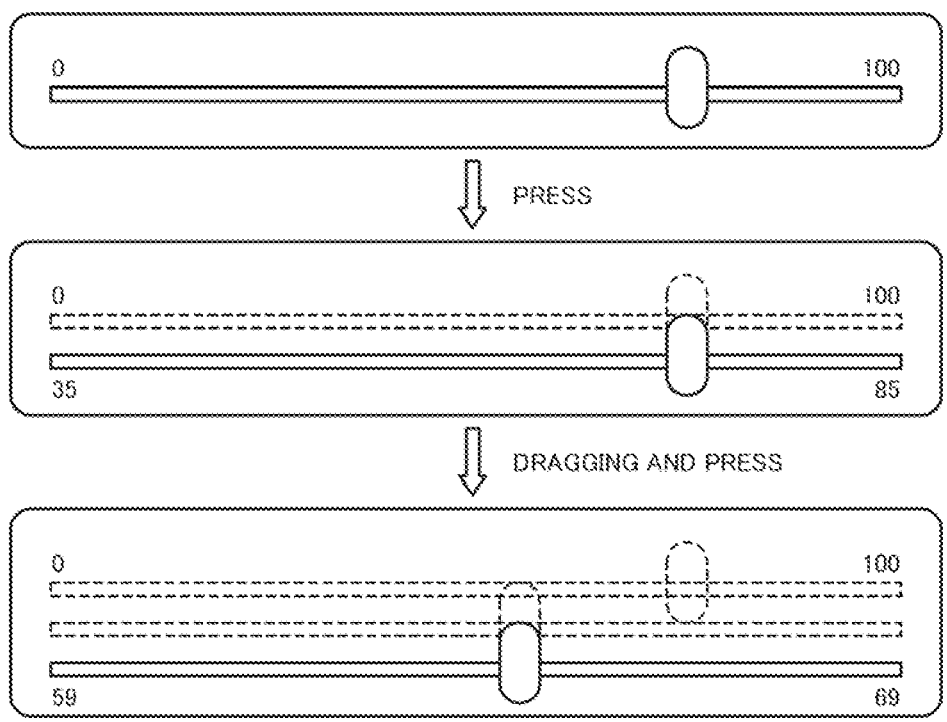
FIG. 16 is an explanatory drawing of an embodiment in which a new bar is indicated parallel to the original bar when slide bars are switched.

Next, another example in which a slide bar after switching is indicated in a place different from that of the slide bar before switching will be described. For example, the slider of a slide bar is arranged to be movable only slightly in directions perpendicular to the longitudinal direction of the bar. Also, operation to move a slider slightly to one of two directions perpendicular to the bar (this operation is referred to as shift operation) is assigned as switching instruction operation of slide bars. Then, when shift operation is performed to a slider, a new slide bar having a bar parallel with the original bar is shown in a place departing from the original one by the shift amount. An example of this is shown in FIG. 16. FIG. 16 shows a case when shift operation has been performed to the slider of a slide bar with a bar having the lower limit value of 0 and the upper limit value of 100. In this case, a new slide bar with a bar having the lower limit value of 35 and the upper limit value of 85 is indicated such that the old and new bars are indicated in parallel with each other staying away from each other by the shift amount. Moreover, when dragging operation and shift operation is performed to the slider of this new slide bar, indication will be as follows. That is, a new slide bar with a bar having the lower limit value of 59 and the upper limit value of 69 is indicated such that the old and new bars are indicated in parallel with each other staying away from each other by the shift amount. In this case, the old slide bars may be left on the screen, or they may be eliminated.

<Touch Operation of a Slider>

Although touch operation in the first and third exemplary embodiments is operation to dab at the slider of a slide bar indicated on a flat display panel having a touch panel with a fingertip, the present invention is not limited to this. That is, touch operation may be operation to dab at a slider not with a fingertip but with something besides a fingertip such as a pen point. Or, touch operation may be operation to put the mouse cursor at a slider and press the left button of the mouse. When a mouse cursor is used, operation to keep pressing the left button more than a given time without moving the mouse cursor that is being placed on a slider may be press operation.

<A Display Position of a Slider Before and After Switching>

In the exemplary embodiments described above, it is arranged that the indication locations of two of an old and a new slider before and after slide bar switching is the same. By this, during change operation of a set value, a slider is made be seen from the user such that the user is keeping touching it at all times. However, indication locations of the sliders of two of an old and a new one do not need to be made same necessarily. That is, for example, by the slide bar control unit 54 of the GUI program 53, a control state should simply be changed to a state that a new slider is being touched from a state that the original slider is being touched. As a result, in connection with a move of a fingertip touching the screen, a shift of a slider indicated in a part besides a fingertip and operation of the slider can be controlled.

Although the present invention has been described with reference to exemplary embodiments above, the present invention is not limited to the above-mentioned exemplary embodiments. Various modifications which a person skilled in the art can understand is allowed to the composition and details of the present invention within the scope of the present invention.

INDUSTRIAL APPLICABILITY

A slide bar display control device according to the present invention is used as a basic component of a graphical user interface (Graphical User Interface: GUI), for example.

What is claimed is:

1. An electronic apparatus comprising:
a display comprising a touch panel on which a user performs a plurality of touch operations; and
a processor and a computer readable memory storing program instructions that when executed by the processor cause the processor to implement:
displaying, on the display, a bar and a slider configured to overlap the bar and slide along the bar, wherein the bar is configured to depict a first range corresponding to a playback content, and wherein a position of the slider in the bar indicates a position in the playback content within the first range,
changing the position of the slider to a first position in the bar based on a first drag operation to the first position,
changing the bar to depict a second range corresponding to the playback content based on the slider changed to the first position in the bar and based on a long touch operation at the first position, the second range being different from the first range,
changing, while the bar depicts the second range corresponding to the playback content, the position of the slider from the first position to a second position in the bar based on a second drag operation to move the slider to the second position, the second drag operation being detected without a release operation between the second drag operation and the long touch operation, and
changing the bar to depict the first range corresponding to the playback content based on a release operation being performed after the second drag operation.

2. The electronic apparatus according to claim 1, wherein the processor is further configured to display a value corresponding to the position of the slider on the display.

3. The electronic apparatus according to claim 1, wherein the processor is further configured to determine, before changing the bar to depict the second range, a first value corresponding to the first position based on a release operation after the first drag operation.

4. The electronic apparatus according to claim 1, wherein the processor is further configured to, in response to detecting the release operation at the second position, change an appearance of the bar from a second appearance corresponding to the second range to a first appearance corresponding to the first range in portions of the bar.

5. The electronic apparatus according to claim 1, wherein the long touch operation is detected after the first drag operation on the slider.

6. The electronic apparatus according to claim 1, wherein the second drag operation on the bar depicting the second range is detected after the long touch operation.

7. The electronic apparatus according to claim 1, wherein the long touch operation is detected by the touch panel when the touch panel keeps detecting a touch to the slider for a period of time.

8. The electronic apparatus according to claim 1, wherein the first drag operation, the long touch operation, the second drag operation and the release operation are detected in a series.

9. The electronic apparatus according to claim 8, wherein no other operations are detected during the series of the operations.

10. A method of controlling a display of an electronic apparatus, the method comprising:
displaying, on the display, a bar and a slider configured to overlap the bar and slide along the bar, wherein the bar is configured to depict a first range corresponding to a playback content, and wherein a position of the slider in the bar indicates a position in the playback content within the first range;
changing the position of the slider to a first position in the bar based on a first drag operation to the first position;
changing the bar to depict a second range corresponding to the playback content based on the slider changed to the first position in the bar and based on a long touch operation at the first position, the second range being different from the first range;
changing, while the bar depicts the second range corresponding to the playback content, the position of the slider from the first position to a second position in the bar based on a second drag operation to move the slider to the second position, the second drag operation being detected without a release operation between the second drag operation and the long touch operation; and
changing the bar to depict the first range corresponding to the playback content based on a release operation being performed after the second drag operation.

11. The method according to claim 10, further comprising displaying a value corresponding to the position of the slider on the display.

12. The method according to claim 10, further comprising determining, before changing the bar to depict the second range, a first value corresponding to the first position based on a release operation after the first drag operation.

13. The method according to claim 10, further comprising, in response to detecting the release operation at the second position, changing an appearance of the bar from a second appearance corresponding to the second range to a first appearance corresponding to a first range in portions of the bar.

14. The method according to claim 10, wherein the long touch operation is detected after the first drag operation on the slider.

15. The method according to claim 10, wherein the second drag operation on the bar depicting the second range is detected after the long touch operation.

16. The method according to claim 10, wherein the long touch operation is detected by a touch panel of the display when the touch panel keeps detecting a touch to the slider for a period of time.

17. The method according to claim 10, wherein the first drag operation, the long touch operation, the second drag operation and the release operation are detected in a series.

18. The method according to claim 17, wherein no other operations are detected during the series of the operations.

19. A non-transitory computer readable medium having stored therein program instructions that when executed by a processor perform a method of controlling a display of an electronic apparatus, the method comprising:
displaying, on the display, a bar and a slider configured to overlap the bar and slide along the bar, wherein the bar is configured to depict a first range corresponding to a playback content, and wherein a position of the slider in the bar indicates a position in the playback content within the first range;
changing the position of the slider to a first position in the bar based on a first drag operation to the first position;
changing the bar to depict a second range corresponding to the playback content based on the slider changed to the first position in the bar and based on a long touch operation at the first position, the second range being different from the first range;

changing, while the bar depicts the second range corresponding to the playback content, the position of the slider from the first position to a second position in the bar based on a second drag operation to move the slider to the second position, the second drag operation being detected without a release operation between the second drag operation and the long touch operation; and changing the bar to depict the first range corresponding to the playback content based on a release operation being performed after the second drag operation.

\* \* \* \* \*